May 20, 1969 R. S. YOUNG ETAL 3,444,726
METHODS OF AND APPARATUS FOR TESTING MOLTEN METAL
Filed Jan. 5, 1966

United States Patent Office 3,444,726
Patented May 20, 1969

3,444,726
METHODS OF AND APPARATUS FOR TESTING MOLTEN METAL
Reginald S. Young, Denham, Uxbridge, and David Edward Pitcher, Lowton, near Warrington, England, assignors to The British Aluminium Company Limited, London, England, a company of Great Britain
Filed Jan. 5, 1966, Ser. No. 518,950
Claims priority, application Great Britain, Jan. 6, 1965, 579/65
Int. Cl. G01n 11/00
U.S. Cl. 73—61
31 Claims

ABSTRACT OF THE DISCLOSURE

An apparatus for determining the contamination of molten metal by solid particles. An acoustic reflector having two spaced reflecting surfaces is submerged in the molten metal and acoustic pulses are transmitted to and received from the reflecting surfaces and the received energy is compared.

---

Figure 1:
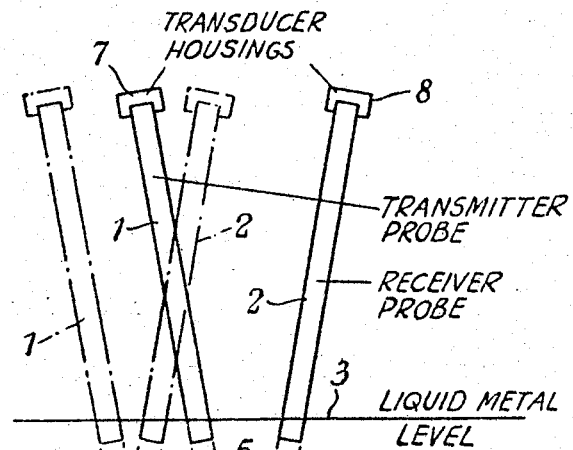

This invention relates to improvements in methods and apparatus for testing molten metal and is particularly concerned with the testing of molten metal to derive a measure of the contamination of the molten metal by solid particles.

The invention is of particular, but not exclusive, application to the manufacture of aluminium and its alloys where the quality of fabricated aluminium judged, for example, by the incidence of blister, is probably directly dependent on the hydrogen content of the metal and the degree of contamination by non-metallic inclusions, e.g. oxide. Apparatus is available for the determination of the hydrogen content of the metal but difficulties have hitherto been experienced in deriving a sufficiently accurate measurement of the non-metallic inclusions.

It is an object of the present invention to provide an improved method of and apparatus for testing molten metal to derive an assessment of the contamination of the metal by insoluble non-metallic particles.

According to one aspect of the present invention, a method of testing molten metal to derive a measure of the solid content thereof comprises the steps of directing, from a transmitter probe extending into the metal, a beam of acoustic pulses towards a first reflecting surface in the metal, detecting the acoustic energy reflected from the first surface by means of a receiving probe extending into the metal, displacing the probes with respect to said first surface in a direction parallel to the level of the liquid metal, directing from the transmitter probe a beam of acoustic pulses towards a second reflecting surface disposed in the metal at a level different from that of the first surface and detecting the reflected acoustic energy by means of the receiving probe.

The distance between the first and second reflecting surfaces is accurately known and the difference between the attenuation of the acoustic energy for the two positions of the probes provides a measure of the solid content of the metal. The detected energy is conveniently visually displayed, for example on a cathode ray tube, so that the relative attenuation of the energy may be readily observed and a measurement can be obtained by means of a calibrated transparent mask. It is preferred, however, to provide a variable attenuator between the receiver probe and the display system so that the received energy may be brought to a common level on the display, the attenuator being suitably calibrated to provide a measure of the relative attenuation of the detected energy and hence of the contamination of the molten metal by solid particles.

According to another aspect of the present invention there is provided apparatus for testing molten metal to derive a measure of the solid content thereof comprising a transmitter probe and a receiver probe intended to extend into the molten metal and respectively to direct a beam of acoustic pulses thereinto and to detect acoustic energy reflected therein, first and second acoustic energy reflecting surfaces intended to be disposed at different levels within the metal and means for guiding and displacing the probes in a direction parallel to the level of the molten metal from one position in which the transmitter probe and the receiver probe are beamed towards the first surface to another position in which the probes are beamed towards the second surface.

The acoustic pulses are preferably pulses of energy at a frequency of from 2½ to 10 mc./s. and a frequency of 5 mc./s. has been found to be particularly suitable.

The two reflecting surfaces are, with advantage, provided by a single stepped surface so that the separation of the reflecting surfaces is accurately known and maintained.

The stepped reflector is conveniently produced in grey cast iron with an external contour to fit the container for the liquid metal. The first and second reflecting surfaces are parallel and positioned so that the one intended to be nearer to the level of the liquid metal, i.e. the upper of the two reflecting surfaces, does not interfere with the beam of acoustic pulses when directed on to the lower or second reflecting surface. The distance between the two reflecting surfaces, i.e. the spacing between the two parallel planes containing these surfaces, is not critical but it should be accurately known and should be as large as practically possible such that attenuation through this distance is greater than possible experimental error, i.e. if high attenuations are being measured this distance may be smaller than if low attenuations are being measured. Typically, it should be at least 2 inches. The reflecting surfaces are sprayed with alternate layers of titania and graphite to prevent attack by the liquid metal.

The probes act as couplings between energy transducers and the liquid metal and their dimensions are controlled by practical considerations. Thus the probes must be sufficiently long to accommodate a cooling jacket at their outer ends to ensure that the temperature of the transducers does not exceed 70° C. Also their bulk must be sufficiently restricted to minimise heat extraction from the molten metal and for ease of handling. A 1-inch diameter rod has been found simple and suitable for use as the probes but beneficial results are obtained using a tapered rod of circular cross-section with the transducer connected to the larger external end of the probe. The effect of this is to reduce the number and amplitude of side reflections reaching the transmitting end of the probe in the molten metal.

An ideal probe material should have the following properties:

(a) A constant low acoustic energy attenuation over the temperature range of 20°–800° C. at frequencies in the range of 2½–10 mc./s. The material should be sound and homogeneous.

(b) A good resistance to thermal and mechanical shock.

(c) A resistance to attack by the molten metal. Any material which has the effect of reacting with the molten metal to form a protective film has the disadvantage that wetting between the immersed transmitting end of the probe of the molten metal will be materially reduced and the advantage that energy transmissions through the side of the probe will be severely reduced.

(d) A low thermal conductivity.

(e) The acoustic resistance, i.e., the product of density and the velocity of sound, should be of the same order as that of the molten metal.

No material has been found to fulfill all these requirements but a low carbon steel has been found suitable, the carbon content being of the order of 0.2%. To protect the probes against erosion by the molten metal and to reduce transmission of energy and detection of acoustic energy through the side wall or walls of the probes, a coating of titania has been found suitable. In order to ensure good transmission properties, the transmitting and receiving ends of the probes (i.e. the immersed ends of the probes) are pre-treated with a silver solder to accelerate wetting by the liquid metal.

The transducers are conveniently crystal transducers and whilst many forms are suitable, lead zirconate crystal bonded to the ends of the probes by phenyl benzoate have been found particularly suitable and to facilitate crystal removal. Matching transformers are incorporated in the crystal housings to obtain optimum efficiency.

The two probes are desirably carried in jigs, clamps or the like carried on suitable means, e.g. a rack and pinion, whereby they may be readily moved in a direction parallel to the level of the liquid metal without any significant variation in the extent to which they extend into the molten metal. Means is also provided whereby the spacing between the probes and also their angle of inclination to the vertical may be varied so that in the one position their axes intersect substantially at the first reflecting surface and, in the second position their axes intersect substantially at the second reflecting surface. It is important that there should not be any significant change in the amount by which the probes extend into the molten metal when moved from one position to the other as there is substantial variation of attenuation in the probe material with variation of temperature and this could lead to substantial errors in measurement if the disposition of the probes relative to the level of the liquid metal is not maintained substantially constant.

Figure 2:
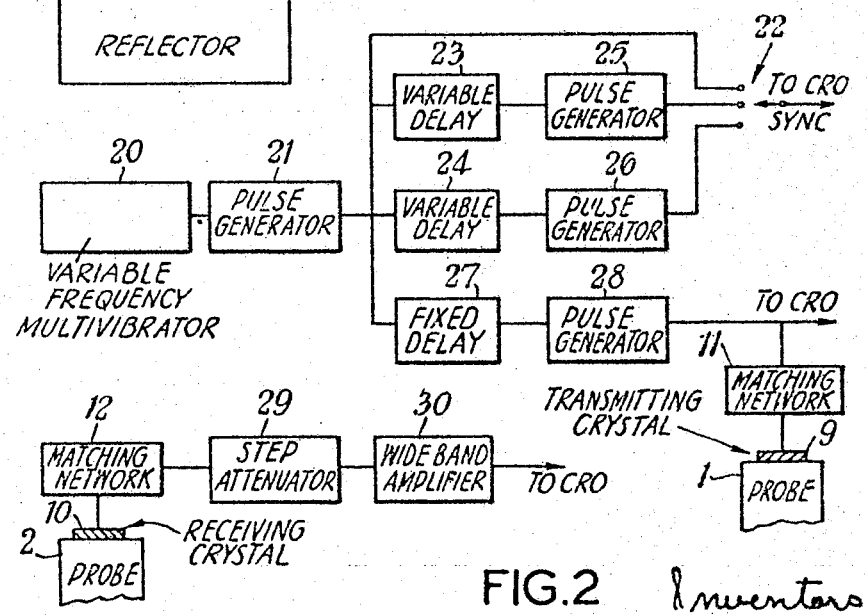
Figure 3:
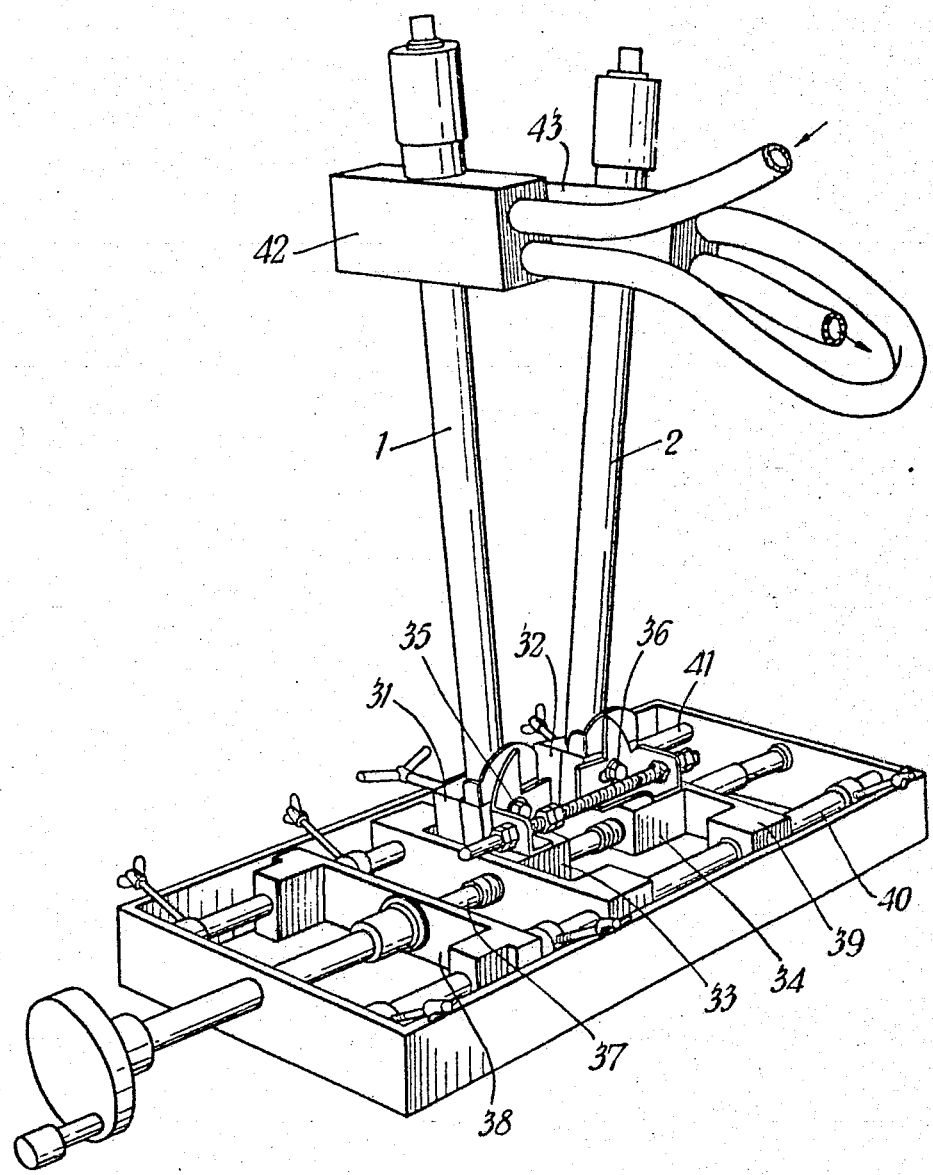

One embodiment of the invention will now be described by way of example, reference being made to the accompanying drawings in which:

FIG. 1 is a somewhat schematic diagram of an apparatus illustrating the principle of the invention, FIG. 2 is a block diagram of the electric circuit associated with the apparatus shown in FIG. 1, and FIG. 3 is a view in perspective of the apparatus.

The apparatus shown in FIG. 1 comprises two low carbon steel probes 1 and 2 formed from 1-inch diameter rod, their axes being contained in a common plane normal to the level 3 of liquid metal and being inclined to the vertical in opposite senses so as to intersect substantially at an acoustic energy reflecting surface 4 disposed within the molten metal. For the purpose of this example, the probe 1 is considered the transmitter probe for directing a beam 5 of acoustic pulses towards the surface 4 and the probe 2 is considered the receiving probe for detecting the reflected beam 6. The sides of the probes, at least for the length immersed in the molten metal are coated with titania as a protection against erosion and to minimize radiation of acoustic energy through the side wall of the probe 1 and detection of acoustic energy through the side wall of probe 2. The lower or transmitting and receiving end faces of the probes 1 and 2 are pretreated with a silver solder to accelerate wetting by the liquid metal and to ensure a substantially unimpeded uniform transmission and reception of acoustic energy. Attached to the outer end face of each probe 1 and 2 is a transducer housing 7 and 8 containing a crystal transducer 9 and 10 (FIG. 2) and a matching transformer (not shown but included in the matching networks 11 and 12 of FIG. 2). The crystal transducers 9 and 10 are lead zirconate bonded to the outer end face of the associated probe with phenyl benzoate to facilitate easy crystal removal. The outer end faces of the probes are ground flat to help adhesion.

The reflecting surface 4 is one of two parallel reflecting surfaces 4 and 13 provided on a grey cast iron stepped reflector 14 which may be externally contoured to fit into a container for the liquid metal, e.g. in a casting launder. The reflecting surfaces are provided with a coating which prevents attack and wetting by the molten metal, in this example, alternate layers of titainia and graphite are provided although in some cases a mixture of these two substances could be used. The distance between the levels of the two reflecting surfaces is accurately known and is not less than 2 inches. The reflector 14 is intended to be mounted in the molten metal under test with the two reflecting surfaces 4 and 13 generally parallel to the level of the molten metal.

As can be seen in FIG. 3, the probes 1 and 2 are respectively carried in clamps 31 and 32 with their axes in a common plane normal to the level of the liquid. The clamps 31 and 32 are respectively mounted on nuts 33 and 34 by bolts 35 and 36 which can be loosened to adjust the angular positions of the clamps 31 and 32 and hence the probes 1 and 2. The nuts 33 and 34 are carried on a threaded rod 37 which has two threads of opposite hand respectively engaged by the nuts 33 and 34 so that rotation of the rod 37 in one direction or the other moves the nuts 33 and 34 further apart or closer together as the case may be to correspondingly displace the probes relative to each other and hence to control the level at which the axes of the probes intersect. The threaded rod 37 is carried in slides 38 and 39 mounted on guide rails 40 and 41 so that longitudinal displacement of the threaded rod with its slides on the rails 40 and 41 produces a corresponding displacement of the probes 1 and 2. Thus, assuming the probes 1 and 2 are initially to be in the full line position shown in FIG. 1, this is achieved by longitudinally displacing the threaded rod 37 with its slides 38 and 39 to the correct position, adjusting the spacing of the probes by rotation of the threaded rod 37 and adjusting their angular positions by loosening the bolts 35 and 36, adjusting the angular positions of the clamps 31 and 32 and tightening up the bolts 35 and 36. In order to displace the probes 1 and 2 to the position shown in chain dotted lines, the threaded rod 37 with its slides 38 and 39 is longitudinally displaced to the required position and the rod 37 is rotated to adjust the spacing between the probes until their axes intersect on the reflecting surface 13.

As can also be seen in FIG. 2, the probes 1 and 2 are cooled adjacent their upper ends by cooling jackets 42 and 43 which are supplied with running water and which are serially connected by a flexible pipe to accommodate changes in the spacing between the probes.

Referring now to FIG. 2 it will be seen that there is provided a variable frequency multivibrator so controlling a pulse generator 21 which is arranged to produce synchronizing pulses. The output from the pulse generator 21 is supplied to one position of a three-position switch 22 and to the other two positions of the switch 22 through separate variable delay units 23 and 24 each followed by a separate reference pulse generator 25 and 26. The switch 22 is connected to the sync circuit of a cathode ray tube display system (not shown). The output from the pulse generator 21 is also supplied through a fixed delay unit 27 and main pulse generator 28 which supplies pulses of energy at a frequency of from 2½ to 10 mc./s and preferably about 5 mc./s. and a repetition frequency of from less than 50 c./s. to greater than 1,000 c./s. but normally about 500–1000 c./s. to the matching network 11 and to the cathode ray tube display system. The matching network 12 is connected through a variable attenuator 29, which is variable in steps, through a wide band amplifier 30 to the cathode ray tube display system.

In use, the reflector 14 is disposed in the liquid metal under test with the reflecting surfaces 4 and 13 substantially parallel to the level of the liquid metal. The reflector 14, for example, may be disposed in a casting launder along which metal is flowed from a liquid metal supply to a casting location. The probes 1 and 2 are disposed generally above the liquid metal with the lower end immersed therein and are beamed on to one or other of the reflecting surfaces 4 and 13. The pulses produced by the generator 28 are bursts of alternating energy and are viewed on the cathode ray tube display system and also produce acoustic pulses in the melt which travel along the beam 5 and are reflected along the beam 6 to the probe 2. These reflected pulses are converted to corresponding electrical pulses which pass through the attenuator 29 and the amplifier 30 to the cathode ray tube display system. Thus both the transmitted and the reflected pulses can be viewed on the cathode ray tube display system, although it may only be necessary to view the received pulses in which case the delays introduced into the system can be adjusted so that the transmitted pulses do not appear. The attenuator 29 is adjusted to give a selected amplitude of received signal which can be viewed through a graduated mask on the display system. The probes 1 and 2 are then displaced, without any substantial change in their depth of immersion in the molten metal, to a position in which the probes 1 and 2 are beamed on to the other of the reflecting surfaces. The amplitude of the newly received signal is adjusted by the attenuator 29 to bring it back to the previous level and the change in value of the attenuator 29 (which may be calibrated) is a function of the undissolved solid content of the metal. Thus the operator has a simple means of assessing whether or not the metal is suitable for the purpose in view.

It will be appreciated that the switch 22 can be used to control the commencement of the time base of the display system and enable various waveforms to be readily and rapidly examined.

It also enables reflections from particles within the melt to be examined at selected levels by, in effect, focussing the time base at selected levels.

It will also be appreciated that as the depth of immersion of the probes 1 and 2 is not substantially varied, the temperature gradient along the probes remains substantially constant and no errors are introduced due to changes in the attenuation in the probes which would otherwise occur.

We claim:

1. A method of testing molten metal to derive a measure of the solid content thereof which comprises the steps of disposing first and second reflecting surfaces at predetermined spaced levels within the molten metal, directing, from a transmitter probe extending into the metal, a beam of acoustic pulses towards the first reflecting surface, detecting the acoustic energy reflected from the first surface by means of a receiving probe extending into the metal, displacing the probes with respect to said first surface in a direction parallel to the level of the liquid metal, directing from the transmitter probe a beam of acoustic pulses towards the second reflecting surface disposed in the metal at a level different from that of the first surface, detecting the reflecting acoustic energy by means of the receiving probe and comparing the energy reflected by said two reflecting surfaces and detected by said receiving probe to derive a measure of the relative attenuation of the energy reflected from said two reflecting surfaces.

2. A method according to claim 1 including the step of attenuating the detected energy reflected from at least one of said reflecting surfaces to bring the reflected energy from said two reflecting surfaces to a common level.

3. A method according to claim 1 wherein said reflected energy detected by said receiving probe is visually displayed.

4. A method according to claim 1 wherein said acoustic pulses are pulses of energy having a frequency of 2½ to 10 mc./s.

5. A method according to claim 4 wherein said frequency is 5 mc./s.

6. A method according to claim 1 wherein said acoustic pulses have a repetition frequency of from 500 to 1000 c./s.

7. A method according to claim 1 including the steps of imparting the acoustic pulses to the transmitter probe by means of a transducer mounted on the outer end thereof, detecting the reflected energy by means of a transducer mounted on the outer end of the receiving probe and cooling the outer ends of the transmitter and receiving probes to maintain the transducers at a temperature not greater than 70° C.

8. A method according to claim 1 in which the transmitter and receiving probes are circular section rods.

9. A method according to claim 8 wherein the rods are tapered with the larger end disposed externally of the molten metal.

10. A method according to claim 1 in which the acoustic energy is imparted from the lower end of the transmitter probe to the molten metal and is received from the molten metal by the lower end of the receiving probe and said lower ends are pretreated to accelerate wetting by said molten metal.

11. A method according to claim 1 including the step of coating the sides of said probes with a material selected to inhibit the transmission of acoustic energy through said sides of said probe.

12. Apparatus for testing molten metal to derive a measure of the solid content thereof comprising a transmitter probe and a receiver probe intended to extend into the molten metal and respectively to direct a beam of acoustic pulses thereinto and to detect acoustic energy reflected therein, reflector means having first and second acoustic energy reflecting surfaces intended to be disposed at predetermined different levels within the metal, means for guiding and displacing the probes in a direction parallel to the level of the molten metal from one position in which the transmitter probe and the receiver probe are beamed towards the first surface to another position in which the probes are beamed towards the second surface and means for comparing the energy reflected by said two reflecting surfaces and detected by said receiving probe to derive a measure of the relative attenuation of the energy reflected from said two reflecting surfaces.

13. Apparatus according to claim 12 wherein the two reflecting surfaces are provided by a single stepped surface.

14. Apparatus according to claim 12 wherein the spacing between the two reflecting surfaces is at least 2 inches.

15. Apparatus according to claim 12 wherein the reflecting surfaces are covered with alternate layers of titania and graphite.

16. Apparatus according to claim 12 wherein the probes are mounted for displacement in direction parallel to the level of the liquid metal without any significant variation in the extent to which they extend into the molten metal.

17. Apparatus according to claim 16 including means for adjustably supporting the probes whereby the spacing between the probes and also their angle of inclination to the vertical may be varied so that in one position their axes intersect substantially at the first reflecting surface and, in a second position, their axes intersect substantially at the second surface.

18. Apparatus according to claim 12 wherein the probes are rods of substantially circular cross-section.

19. Apparatus according to claim 18 wherein the probes are tapered towards that end intended to be immersed in the molten metal.

20. Apparatus according to claim 12 wherein the probes are formed from a low carbon steel.

21. Apparatus according to claim 12 wherein the side walls of the probes are coated with titania.

22. Apparatus according to claim 12 wherein the transmitting and receiving ends of the probes are pretreated with a silver solder to facilitate wetting by the molten metal.

23. Apparatus according to claim 12 wherein each probe has mounted on its outer end an energy transducer, each probe being intended to act as a coupling between the associated transducer and the liquid metal.

24. Apparatus according to claim 23 wherein each transducer is a lead zirconate crystal transducer.

25. Apparatus according to claim 24 wherein each transducer is bonded to the outer end of the associated probe by phenyl benzoate.

26. Apparatus according to claim 23 wherein cooling means is provided over at least a part of that part of each probe not intended to extend into the molten metal to ensure that the temperature of the associated transducer does not exceed 70° C.

27. Apparatus according to claim 23 including an electrical pulse generator electrically connected to the transducer associated with the transmitter probe to generate said acoustic pulses.

28. Apparatus according to claim 27 wherein said pulse generator is arranged to generate said acoustic pulses as pulses of energy at a frequency of from 2½ to 10 mc./s.

29. Apparatus according to claim 27 wherein the transducer associated with the receiver probe is supplied to a variable attenuator.

30. Apparatus according to claim 29 including means for comparing the signals derived from the pulse generator and the variable attenuator.

31. Apparatus according to claim 30 wherein said comparing means comprises a visual display device.

References Cited
UNITED STATES PATENTS

| | | | |
|---|---|---|---|
| 2,819,613 | 9/1958 | Neiley | 73—67.7 |
| 3,320,797 | 5/1967 | Tajiri et al. | 73—67.7 |
| 3,093,998 | 6/1963 | Albertson et al. | 73—61 |

RICHARD C. QUEISSER, *Primary Examiner.*

JOHN P. BEAUCHAMP, *Assistant Examiner.*

U.S. Cl. X.R.

73—67.7